United States Patent
Kulig

[15] 3,701,407
[45] Oct. 31, 1972

[54] GLASSWARE TRANSFER MECHANISM

[72] Inventor: Constantine W. Kulig, Windsor, Conn.

[73] Assignee: Emhart Corporation, Bloomfield, Conn.

[22] Filed: Feb. 2, 1971

[21] Appl. No.: 111,855

Related U.S. Application Data

[63] Continuation of Ser. No. 801,395, Feb. 24, 1969, abandoned.

[52] U.S. Cl. ..........................198/20, 74/395, 198/30
[51] Int. Cl. ..............................................B65g 47/00
[58] Field of Search ...............198/20, 30, 23; 74/395

[56] References Cited

UNITED STATES PATENTS

| | | | |
|---|---|---|---|
| 1,519,544 | 12/1924 | McIndoe | 74/395 X |
| 2,030,028 | 2/1936 | Greenwood | 74/345 |
| 2,616,550 | 11/1952 | Rowe | 198/20 |
| 2,912,093 | 11/1959 | Lauck | 198/20 |

Primary Examiner—Evon C. Blunk
Assistant Examiner—H. S. Lane
Attorney—McCormick, Paulding & Huber

[57] ABSTRACT

A transfer mechanism for use with mutually perpendicular in-feed and cross conveyors has an endless chain entrained over two sprockets arranged one on either side of the in-feed conveyor, with the first of these being driven in timed relationship with the in-feed converter and located somewhat upstream of the cross conveyor. The second sprocket is located adjacent the cross conveyor and downstream of both it and the driven sprocket. A portion of the chain extends across adjacent portions of these conveyors and carries pusher elements for feeding the articles being handled off the in-feed conveyor across a deadplate, and onto the cross conveyor in accurately index relationship to one another. A guide bar associated with the cross conveyor urges the articles being transferred outwardly beyond the extremities of the pusher elements as they reach the desired point on the cross conveyor. Means is also described for confining the chain portion referred to above for movement in a generally arcuate path such that the glassware articles on the in-feed conveyor are engaged by the pusher elements as the latter move in substantially same direction as said in-feed conveyor, and for gradually turning the articles off the in-feed conveyor across the deadplate and onto the cross conveyor.

1 Claim, 8 Drawing Figures

PATENTED OCT 31 1972 3,701,407

INVENTOR
CONSTANTINE W. KULIG
BY McCormick, Paulding & Huber
ATTORNEYS

GLASSWARE TRANSFER MECHANISM

BACKGROUND OF THE INVENTION

This application is a continuation of our prior application of the same title filed Feb. 24, 1969 under Ser. No. 801,395, now abandoned.

Various devices have been proposed heretofore for transferring glassware articles from a first conveyor onto a second conveyor in accurately indexed relationship to one another. U.S. Pat. No. 2,616,550 issued to Rowe, Nov. 4, 1952 and assigned to the assignee herein shows one such apparatus for accomplishing this purpose. In this disclosure two sprockets have an endless carrier chain entrained thereon and carry pusher elements for moving continuously fed glassware articles off an in-feed conveyor onto a cross conveyor arranged at a substantial angle with respect to the in-feed conveyor. However, in the disclosure in this patent the driven sprocket is quite large in diameter and arranged over the in-feed conveyor so that the articles being fed into the pockets defined by the pusher elements undergo an abrupt deceleration as they are stopped and shifted laterally onto the cross conveyor.

Another article transfer apparatus is shown in U.S. Pat. No. 2,912,093 issued to Lauck Nov. 10, 1959. The Lauck apparatus shows two sprockets, arranged one on either side of an in-feed conveyor, have an endless carrier chain entrained thereon and carry pusher elements which move diagonally across the in-feed conveyor and thence arcuately across a deadplate and onto a cross conveyor. However, the cross conveyor is orientated at only 60° or 70° with respect to the in-feed conveyor. In Lauck, as in Rowe, the articles are rather abruptly decelerated as they engage the ware transfer apparatus. In Rowe the chain is oriented at almost 90° with respect to the direction of movement of the articles on the in-feed conveyor in the area of engagement, while in Lauck the impact is reduced somewhat by orienting the chain at an angle of approximately 40° with respect to the in-feed conveyor. In order to further reduce this angle, without reducing the angular orientation the cross conveyor, the present invention is so designed that the angle at impact is reduced to approximately 15°, and this without departing from the preferred 90° orientation of the cross conveyor.

An object of the present invention is to provide an article transfer device in which the articles being fed into the pockets defined by the pusher elements on its associated carrier chain do not undergo any abrupt or sharp deceleration of acceleration prior to being fed onto a cross conveyor arranged at substantially right angles to such an in-feed conveyor.

SUMMARY OF INVENTION

This invention relates to improvements in mechanisms for transferring articles of glassware such as bottles, jars or the like from one moving horizontal conveyor to a second adjacent moving horizontal conveyor, and deals more particularly with an article transfer mechanism for transferring articles from the first conveyor onto the second conveyor without imparting an abrupt acceleration or deceleration to the articles as they are transferred onto said second conveyor in single file uniformly spaced order.

BRIEF DESCRIPTION OF THE DRAWINGS

FIG. 5 is a vertical sectional view taken along the line 5—5 of FIG. 1 showing the mechanism for adjustably mounting the transfer mechanism longitudinally of the in-feed conveyor.

FIG. 8 is a schematic view of one possible combination of pusher and spacer elements mounted on an endless carrier chain of the type shown in FIG. 1 illustrating the configuration which might be adopted for handling glassware articles of somewhat larger size than that shown in FIG. 1.

DETAILED DESCRIPTION

Figure 1:
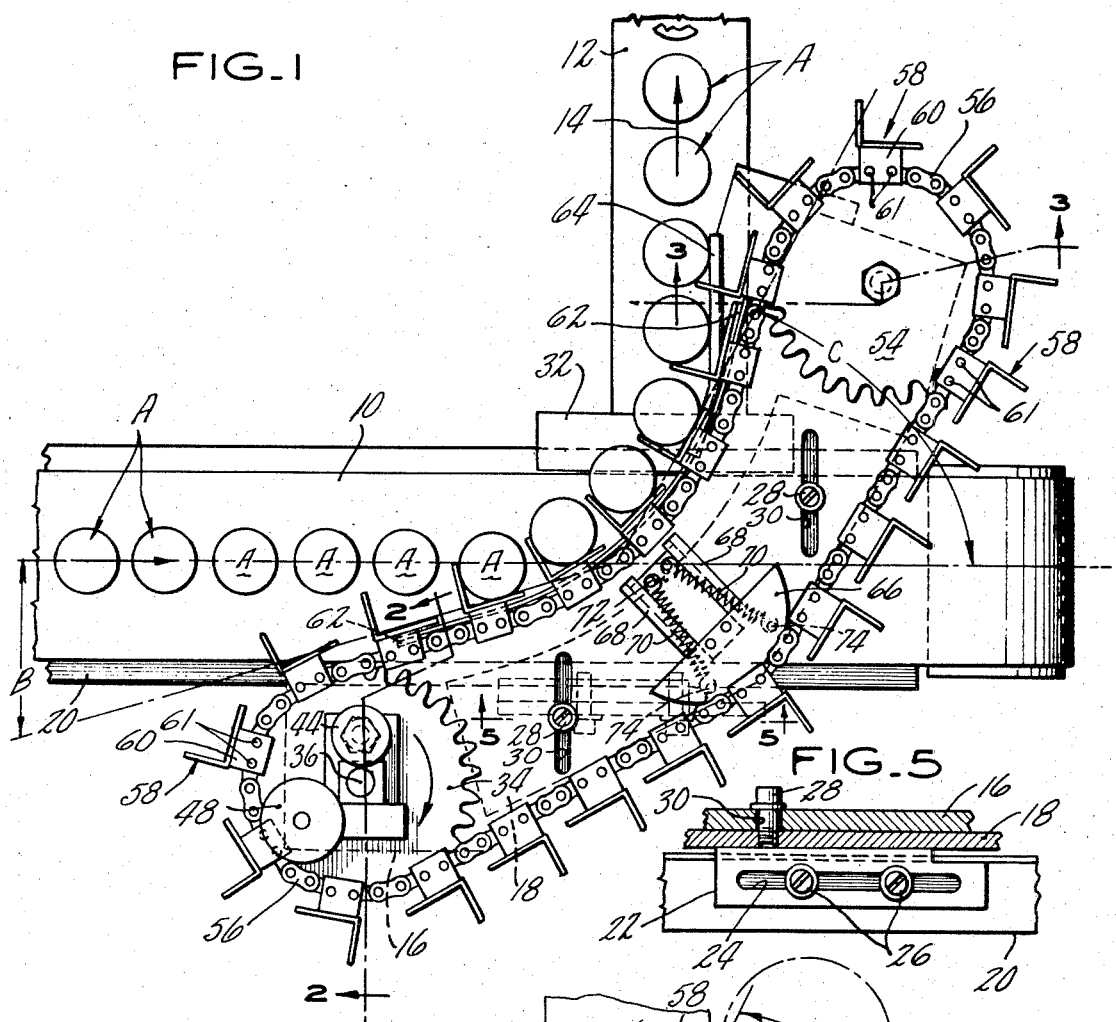
FIG. 1 is a plan view of a glassware transfer mechanism constructed in accordance with the present invention, showing a plurality of relatively small glassware articles being transferred from an in-feed conveyor onto a cross conveyor.

Turning now to the drawings in greater detail, FIG. 1 shows an in-feed conveyor 10 of the type which may be used for conduction newly formed glassware articles from glassware forming machine (not shown). In accordance with the present invention means is provided for transferring these articles A,A to a second, or cross conveyor 12, which is moving in a direction away from the in-feed conveyor as indicated by the arrow 14. The cross conveyor may be used to convey the newly formed glassware to a stacker (not shown) prior to delivery to an annealing lehr or the like. The newly formed glassware articles may be uniformly spaced on the in-feed conveyor, or as is more likely, may not be uniformly spaced but only approximately so in the manner normally associated with present day glassware take-out equipment and take-away conveyor systems of the type associated with double and triple gob glassware forming machines. The transfer mechanism to be described for moving these articles off the infeed conveyor 10 onto the cross conveyor 12 serves to uniformly space the articles in single file on the cross conveyor. The spacing itself being a function, primarily, of the speed of the cross conveyor. It will of course be understood that these conveyors may be used to convey articles of various descriptions from and to various mechanism other than those specifically mentioned above, or for any other useful purpose.

The transfer mechanism comprises a mounting plate 16 extending across and above the adjacent portions of the conveyors, 10 and 12, and is supported by a base plate 18, as best shown in FIG. 5. The base plate 18 is in turn supported from the fixed frame 20 of the in-feed conveyor 10 by a bracket 22 having a longitudinally extending slot 24 in which a plurality of clamping screw 26, 26 are provided for positioning the mounting plate 16 longitudinally in the direction of the movement of the in-feed conveyor 10. The plate 16 is thus adjustably mounted longitudinally with respect to the conveyor 10. The mounting plate 16 is also adjustable transversely with respect to the in-feed conveyor 10. A pair of screws 28, 28 are received in transversely extending slots 30, 30 in the mounting plate 16 and threadably received in the base plate 18 as best shown in FIG. 1 to permit such lateral adjustments to be made. A fixed deadplate 32 is provided adjacent one side edge of the in-feed conveyor 10 adjacent the upstream end of the cross conveyor 12 so that the articles A, A being transferred from the first conveyor 10 to the second conveyor 12 can be slid across said deadplate 32 by pusher elements on a carrier chain to be described.

In accordance with the present invention a driven sprocket 34 is rotatable supported adjacent the opposite side edge of the in-feed conveyor, on one end of the mounting plate 16, and a shaft 36 for this sprocket is driven in timed relationship to the in-feed conveyor by suitable means (not shown). It is noted that both the in-feed conveyor and the drive shaft 36 are preferably driven from the glassware forming machine itself in a manner well known in the art.

Figure 2:
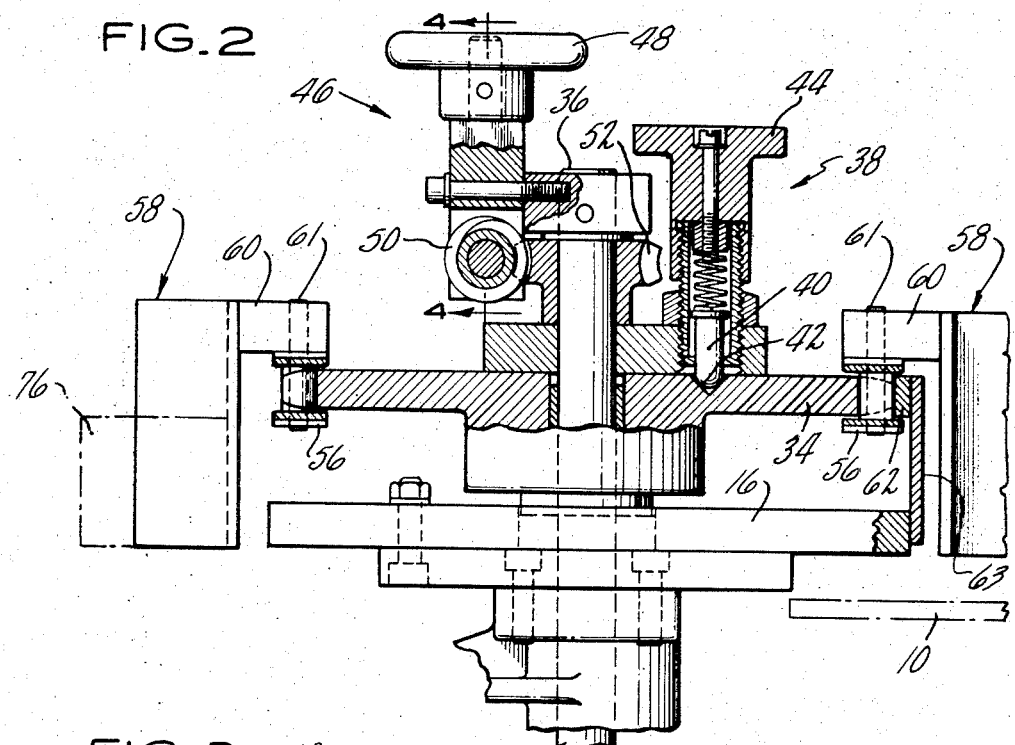
FIG. 2 is a vertical sectional view of the driven sprocket shown in FIG. 1 being taken along the lines 2—2 of that view.
Figure 4:
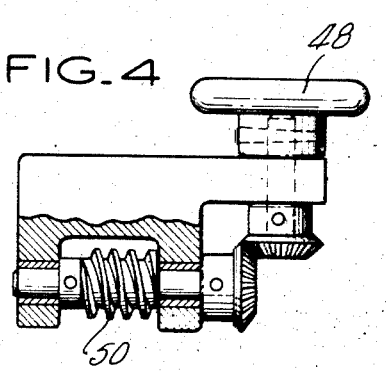
FIG. 4 is a vertical sectional view taken along the line 4—4 of FIG. 2.

As best shown in FIG. 2, the sprocket 34 is drivingly connected to the shaft 36 through a drive release or overload device indicated generally at 38, which device allows the carrier chain and its associated pusher elements to be interrupted in movement should they become jammed as a result of broken glassware articles on the conveyors. This overload device 38 comprises a spring-loaded plunger 40 which is adapted to normally detent 42 in the sprocket 34. The hand knob 44 is shown in its lowered position to compress a spring for normally driving the sprocket. The spring serves to automatically disengage the drive shaft 36 from the sprocket 34 whenever the carrier chain experiences a predetermined overload force. Turning the knob 44 to its raised position (not shown) releases the spring force and disengages the sprocket 34 from its shaft 36. Thus, the pusher elements can be stopped without stopping the drive shaft 36 to allow removing or replacing these pusher elements. FIG. 2 also shows suitable means for adjustably positioning the sprocket 34 with respect to its associated drive shaft 36 in order to assure that the location of the pusher elements 58, 58 on the carrier chain are in phase with the location of the articles to be transferred on the in-feed conveyor. Said means, indicated generally at 46 in FIG. 2 comprises a handwheel 48 which can be conveniently rotated while the transfer mechanism is in operation. A worm gear 50 is rotated in response to rotation of the hand wheel 48 as best shown in FIG. 4, and a gear 52 on the drive shaft 36 meshes with the worm gear 50 to alter the angular position of the latter with respect to the sprocket 34 to achieve the desired phase relationship between the pusher elements on the carrier chain and the articles of glassware being fed to the transfer mechanism by the in-feed conveyor 10.

Figure 3:
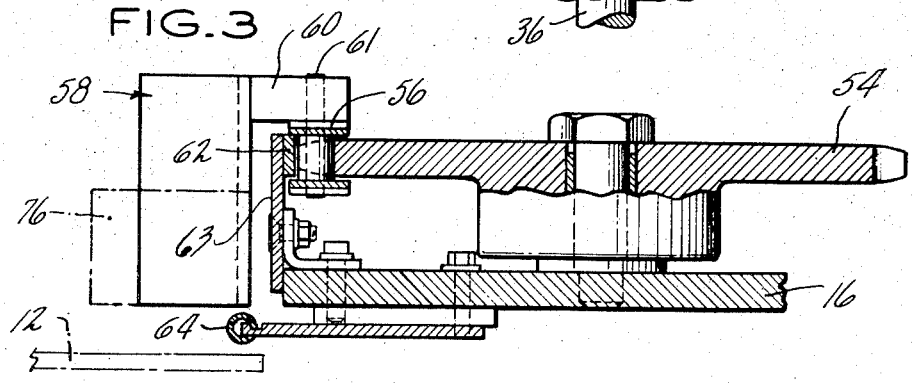
FIG. 3 is a vertical sectional view of the idler sprocket shown in FIG. 1 being taken along the line 3—3 of that view.

As best shown in FIG. 1 the driven sprocket 34 is arranged adjacent one side of the in-feed conveyor 10, and an idler sprocket 54 is provided adjacent the opposite side the in-feed conveyor 10 and adjacent the upstream end of the cross conveyor 12 the sprocket 54 being rotatably mounted in the opposite end of the mounting plate 16 from the end which supports the sprocket 34. A conventional endless chain 56 is entrained over the sprockets 34 and 54, and carries a plurality of pusher elements 58,58 for engaging the articles A,A delivered thereto by the in-feed conveyor and urging the same laterally off the conveyor 10 onto the second conveyor 12. As best shown in FIGS. 2 and 3, these pusher elements 58,58 are supported from the chain 56 by an inverted L-shaped bracket 60 having two locating holes made with the pins 61. This allows easy removal and replacement of the pusher elements. The article engaging portions of these pusher elements 58,58 are thereby located adjacent the surface of the associated conveyors 10 and 12.

It is an important feature of the present invention that the chain portion which carries those pusher elements in engagement with the glassware follows an arcuate or generally concave path extending from a point tangent to the driven sprocket 34 at one side of the in-feed or first conveyor to a point tangent to the sprocket 54 located on the opposite side of said in-feed conveyor. More particularly, means is provided on the mounting plate 16 for confining that chain portion which extends across the adjacent portions of these conveyors to move said chain portion in a generally concave or arcuate path so oriented that the pusher elements move in substantially the same direction as the articles on the first conveyor during initial engagement therewith. As best shown in FIG. 1, the angular orientation of the path of these pusher elements, with respect to the direction of movement of the articles on the conveyor 10, is on the order of 10°–20°, and is preferably about 15° so as to minimize the impact upon engagement. Preferably, and as best shown in FIG. 3, a guide member 62 is mounted on legs 63, 63 carried by the mounting plate 16 so as to engage the rollers of the chain 56 and confine said chain to follow the concave path depicted in FIG. 1. As best shown in that view the carrier chain 56 and its associated pusher elements 58, 58 are thereby confined to move in substantially the same direction as that of the articles on the in-feed conveyor at least during initial engagement therewith, and to move in substantially the same direction as the direction of movement of the cross conveyor at the point on said cross conveyor where said articles are released by said pusher elements. Thus, and in keeping with the stated objects of the present invention, the articles being transferred are pushed gently from the in-feed conveyor to the cross conveyor at uniform speed through a smooth continuous path wherein the articles follow one another without impact of the articles against or by the pusher elements. From FIG. 1 it will be apparent that the continuously curving concave path of the articles, even as they are advancing on the conveyor 10 results in a gradual change in direction of at least twice the incident angle of 15°, which change of direction is achieved as said articles reach the deadplate 32, and prior to the cross conveyor 12.

In further accordance with the present invention and to assure that the articles being placed on the cross conveyor by the pusher elements are released at a particular point thereon, a fixed guide bar 64 is provided above the surface of the cross conveyor at the desired release point of the pusher elements 58, 58 so as to cause the articles to positively clear the pusher elements at the desired release point.

In order to provide means for continually applying a predetermined degree of tension to the roller chain 56, a slack take-up plate 66 is slidably mounted to the plate 16 on gibs 68, 68. Tension springs 70,70 act between the inner end of the pressure plate as shown at 72 and dowels provided for this purpose in the plate 16 as shown at 74.

Figure 6:
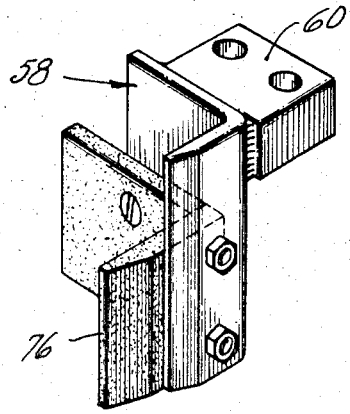
FIG. 6 is a perspective view of one of the pusher elements shown in FIG. 1 mounted on the endless carrier chain.
Figure 7:
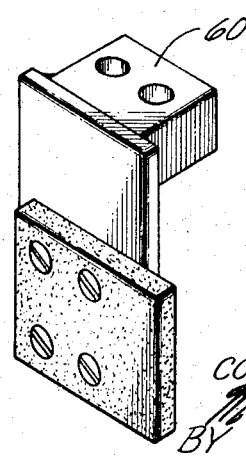
FIG. 7 is a perspective view of a spacer element which can be used to replace one or more of the pusher elements shown in FIG. 6 for handling relatively larger ware.

Finally, FIG. 6 shows an insert 76 for the pusher element 58 and FIG. 7 shows, in perspective, the configuration of the substitute spacer elements for replacing the pusher elements to allow the handling of larger size glassware articles as depicted in FIG. 8.

I claim:

1. In an apparatus for transferring articles from a first conveyor onto a second conveyor oriented generally perpendicularly to the first conveyor, said apparatus including a deadplate alongside said first conveyor, and said apparatus further including a pair of sprockets arranged one on either side of said first conveyor, and an endless carrier chain entrained on said sprockets and having spaced outwardly projecting article engaging pusher elements mounted thereon and adapted to move successively across said first conveyor and thence across the deadplate and finally across the second conveyor, the improvement comprising chain confining plate means to restrict said elements to movement along a continuously curving concave path while in contact with the articles being transferred, said plate means causing said pusher elements to move into initial contact with the articles on said first conveyor at a shallow incident angle in the range between 10° and 20°, and said chain confining plate means further serving to cause said elements to gradually change direction and to turn said articles through an angle at least twice said incident angle upon reaching said deadplate and prior to said second conveyor, one of said sprockets comprising a driven sprocket, and sprocket drive release device including a spring loaded plunger normally received in a detent in said driven sprocket, and means for adjustably positioning the driven sprocket independently of said drive overload release plunger, said means for adjustably positioning said driven sprocket including a high friction worm gear located in mechanical series between said driven sprocket and said drive overload release plunger.

* * * * *

Dedication 3,701,407.—*Constantine W. Kulig*, Windsor, Conn. GLASSWARE TRANSFER MECHANISM. Patent dated Oct. 31, 1972. Dedication filed Jan. 7, 1976, by the assignee, *Emhart Corporation*.

Hereby dedicates to the Public the entire remaining term of said patent.

[*Official Gazette March 16, 1976.*]